United States Patent
Wang et al.

(10) Patent No.: US 11,850,577 B2
(45) Date of Patent: Dec. 26, 2023

(54) PILOT-SCALE SUPERCRITICAL WATER OXIDATION OIL AND HYDROGEN PRODUCTION SYSTEM CAPABLE OF REALIZING LONG-DISTANCE MULTI-STAGE HEATING OF ORGANIC ROCK

(71) Applicant: Taiyuan University of Technology, Taiyuan (CN)

(72) Inventors: Lei Wang, Taiyuan (CN); Zhiqin Kang, Taiyuan (CN); Qiaorong Meng, Taiyuan (CN); Guibin Zhao, Taiyuan (CN); Hongge Zhang, Taiyuan (CN); Dong Yang, Taiyuan (CN); Jing Zhao, Taiyuan (CN)

(73) Assignee: Taiyuan University of Technology

( * ) Notice: Subject to any disclaimer, the term of this patent is extended or adjusted under 35 U.S.C. 154(b) by 0 days.

(21) Appl. No.: 18/080,843

(22) Filed: Dec. 14, 2022

(65) Prior Publication Data
US 2023/0191348 A1 Jun. 22, 2023

(30) Foreign Application Priority Data
Dec. 16, 2021 (CN) .......................... 202111538289.9

(51) Int. Cl.
*B01J 3/04* (2006.01)
*B01J 19/24* (2006.01)
(Continued)

(52) U.S. Cl.
CPC .............. *B01J 3/008* (2013.01); *B01J 3/042* (2013.01); *B01J 6/008* (2013.01); *B01J 19/242* (2013.01);
(Continued)

(58) Field of Classification Search
None
See application file for complete search history.

(56) References Cited

U.S. PATENT DOCUMENTS

| | | | |
|---|---|---|---|
| 5,725,054 A | * | 3/1998 | Shayegi ................ E21B 43/164 |
| | | | 166/305.1 |
| 2018/0045704 A1 | * | 2/2018 | Al-Otaibi ........... G01N 15/0826 |

FOREIGN PATENT DOCUMENTS

| | | | | |
|---|---|---|---|---|
| CN | 101446189 A | * | 6/2009 | |
| CN | 105952424 A | * | 9/2016 | ............. E21B 43/20 |

(Continued)

*Primary Examiner* — Jennifer A Leung
(74) *Attorney, Agent, or Firm* — IP Attorneys Group, LLC

(57) ABSTRACT

The present disclosure belongs to the technical field of clean and efficient mining of deep unconventional or conventional resources, and discloses a pilot-scale supercritical water oxidation oil and hydrogen production system capable of realizing multi-stage heating of organic rock. The system comprises a supercritical water generator, a supercritical water pyrolysis reaction system for organic rock, an oxygen injection system and an oil-gas condensation and collection system, wherein the supercritical water generator mainly comprises a water injection system, a front-section preheating system, a second-stage heating system and a third-stage heating system. The reaction system can carry out a pilot-scale simulation process of supercritical water pyrolysis for organic rock, a multi-stage heating function is realized, the maximum reaction distance is 8 m or more, and the release characteristics of oil-gas products under different reaction distances are explained.

11 Claims, 6 Drawing Sheets

(51) Int. Cl.
*E21B 43/241* (2006.01)
*B01J 3/00* (2006.01)
*B01J 6/00* (2006.01)
*C09K 8/592* (2006.01)

(52) U.S. Cl.
CPC ........... *B01J 19/2425* (2013.01); *C09K 8/592* (2013.01); *E21B 43/241* (2013.01); *B01J 2219/00009* (2013.01); *B01J 2219/00159* (2013.01)

(56) References Cited

FOREIGN PATENT DOCUMENTS

| | | | | | |
|---|---|---|---|---|---|
| CN | 108222898 | A | * | 6/2018 | ........... E21B 43/168 |
| CN | 202010030710.4 | A | | 4/2020 | |
| CN | 112727418 | A | * | 4/2021 | ........... E21B 43/241 |
| CN | 202110077166.3 | A | | 4/2021 | |
| CN | 113621399 | A | * | 11/2021 | |
| CN | 113667507 | A | * | 11/2021 | |
| WO | WO-2012017197 | A1 | * | 2/2012 | ............. E21B 43/20 |

* cited by examiner

PILOT-SCALE SUPERCRITICAL WATER OXIDATION OIL AND HYDROGEN PRODUCTION SYSTEM CAPABLE OF REALIZING LONG-DISTANCE MULTI-STAGE HEATING OF ORGANIC ROCK

CROSS-REFERENCE TO RELATED APPLICATION

This patent application claims the benefit and priority of Chinese Patent Application No. 202111538289.9, filed with the China National Intellectual Property Administration on Dec. 16, 2021, the disclosure of which is incorporated by reference herein in its entirety as part of the present application.

TECHNICAL FIELD

The present disclosure belongs to the technical field of clean and efficient mining of deep unconventional or conventional resources, and discloses a pilot-scale supercritical water oxidation oil and hydrogen production system capable of realizing multi-stage heating of organic rock. The system is used for carrying out the pilot simulation process of supercritical water oxidation pyrolysis of organic rocks, and can realize the functions and effects of in-situ oil production and hydrogen production of organic rocks.

BACKGROUND

At present, shaft mining is the main mining method of organic rock mineral resources, but environmental and ecological problems caused by shaft mining are becoming more and more serious. On one hand, coal power generation and oil shale dry distillation cause a large accumulation area of waste rock, and gas waste emissions can pollute the atmosphere, resulting in environmental problems such as mine fog and acid rain. On the other hand, mining is easy to cause land subsidence, destruction of ground buildings and structures, groundwater loss and pollution. At the same time, the safety problems during deep seam mining are also very serious. At present, with the increasingly prominent environmental problems, how to face the pressure of environmental protection and ecological reconstruction in organic rock mining and realize green mining is an important issue.

The in-situ mining technology only needs to drill holes and lay wells on the ground, and the mineral deposits are directly heated through hot injection wells. After organic matters are fully pyrolyzed, gaseous products of the organic matters are discharged from other well patterns. The technology is obvious in economy and environmental protection. When water is at the critical point (374.3° C., 22.05 MPa) at high temperature and high pressure, the water is called supercritical water. The supercritical water with extremely strong oxidizing ability can dissolve many substances and has a super catalytic effect. In the supercritical water, chemical substances react quickly, and the reaction speed can even reach 100 times. Therefore, in-situ pyrolysis of organic rock deposits with supercritical water as a heat transfer fluid is a very feasible scheme. Through supercritical water pyrolysis of organic rock deposits, organic matters in the rock mass can be cracked to form gaseous oil, and supercritical water carried products can be discharged and collected on the ground by physical methods for oil-water separation, so that the effect of in-situ oil production is realized. After high-temperature pyrolysis of organic mineral deposits, a large number of high-temperature residual carbon zones are formed, and the high-temperature residual carbon zones chemically react with water and oxygen to form an oxidizing zone, so that hydrogen and carbon dioxide are produced. The mixed gas can be separated on the ground, and the hydrogen can be directly compressed as hydrogen energy, so that the in-situ hydrogen production effect is realized. The carbon dioxide can be deeply sealed, so that an extremely high energy utilization rate is realized. Meanwhile, clean energy sources with extremely high utilization values are produced, and fully conform to the targets of peak carbon dioxide emissions and carbon neutrality. On the other hand, a large amount of heat generated by the reaction of high-temperature residual carbon with oxygen can be used as a temperature source of pyrolysis in other low-temperature organic rock areas, so that the energy utilization rate is greatly improved.

In the Chinese patent CN110965968A in the prior art, oil shale is heated by electric heating technology, and then nitrogen or other liquid is introduced to discharge and collect oil-gas products formed by pyrolysis of oil shale. In the Chinese patent CN112727418A, the process of pyrolysis of oil shale and oil and gas collection by high temperature steam is simulated. There are some problems in the prior art. The reaction distance is short, and the simulation result is quite different from the actual situation; the high-temperature residual carbon formed by pyrolysis of oil shale cannot be further utilized; and staged heating cannot be realized. For deep organic reservoirs, due to the long well pipe, the heat dissipation of high-temperature steam injected from the wellhead into the deposit is serious, so that the efficient pyrolysis of deep reservoirs cannot be guaranteed. The high-temperature residual carbon formed by oil shale pyrolysis cannot be further utilized. If oxygen injection is carried out, the material of the reactor cannot meet the high-temperature conditions, so the oxygen injection function cannot be realized, and the in-situ hydrogen production process cannot be simulated.

SUMMARY

The present disclosure overcomes the disadvantages in the prior art, and provides a pilot-scale supercritical water oxidation oil and hydrogen production system capable of realizing multi-stage heating of organic rock. Through the system, the pilot simulation process of supercritical water pyrolysis of organic rocks can be carried out, the reaction mechanism of supercritical water pyrolysis of organic rocks can be deeply researched, and the release characteristics of oil-gas products at different reaction distances can be explained. At the same time, the effect of hydrogen production by adding oxygen to high-temperature residual carbon and the optimal oxygen injection parameters can be obtained, so that theoretical basis is provided for field practice.

In order to achieve the above-mentioned purpose, the present disclosure is realized through the following technical scheme.

A pilot-scale supercritical water oxidation oil and hydrogen production system capable of realizing multi-stage heating of organic rock comprises a supercritical water generator, a supercritical water pyrolysis reaction system for organic rock, an oxygen injection system, branch oil-gas condensation and collection systems and a main oil-gas condensation and collection system.

The supercritical water generator mainly comprises a water injection system, a front-section preheating system, a second-stage heating system and a third-stage heating system which are connected in sequence; and the front-section preheating system comprises a preheating kettle, the working temperature of the preheating kettle is 25-350° C., the working temperature of the second-stage heating system is 25-500° C., and the working temperature of the third-stage heating system is 25-650° C.

The supercritical water pyrolysis reaction system for organic rock comprises a supercritical water oxidation reaction kettle; the supercritical water oxidation reaction kettle is provided with thermocouples at equal intervals from the inlet to the outlet, pressure sensors at equal intervals from the inlet to the outlet, temperature control heating systems in sections, and oxygen injection ports at equal intervals from the inlet to the outlet; the branch oil-gas condensation and collection systems are arranged at equal intervals from the inlet to the outlet; the inlet end of the supercritical water oxidation reaction kettle is connected with the supercritical water generator through a pipeline; the outlet end of the supercritical water oxidation reaction kettle is connected with the main oil-gas condensation and collection system; the endurable temperature of the supercritical water oxidation reaction kettle is greater than or equal to 800° C.; the oxygen injection ports are connected with the oxygen injection system; and the flow rate of oxygen injection of the oxygen injection system is 5 mL/min to 5 L/min.

The main oil-gas condensation and collection system comprises an oil-gas filtering device, and a condensation heat exchange system and a gas-liquid separation system which are connected with the oil-gas filtering device.

Further, the water injection system comprises a water replenishing tank, a condensation circulating pump, a front-end liquid replenishing pump, high-pressure injection pumps and a condensing pipeline; a thermocouple is arranged at the outlet end of the condensation circulating pump; and the condensation circulating pump, the condensing pipeline and the water replenishing tank form a closed and connected condensing channel to prevent the high temperature of the preheating kettle from being transmitted to the high-pressure injection part.

Further, the front-end liquid replenishing pump is connected with the high-pressure injection pumps through stop valves, and the outlet of the high-pressure injection pump is provided with a pulse damper, an overflow valve, a safety valve, a temperature and pressure sensor and an explosion-proof valve; the set pressure of the safety valve is greater than that of the overflow valve; the outlet of the explosion-proof valve is connected with the condensing pipeline; and high-pressure water passes through a high-temperature and high-pressure stop valve to enter the interior of the preheating kettle through the condensing pipe.

Further, a liquid level gauge is arranged on the preheating kettle, and a temperature and pressure sensor is arranged on the top of the preheating kettle; and a heating cavity of the preheating kettle is formed in the bottom of the preheating kettle, a sewage outlet is formed in the lower end of the heating cavity, and the sewage outlet is connected with a high-temperature and high-pressure stop valve and a high-temperature pressure reducing valve.

Further, each of the second-stage heating system and the third-stage heating system comprises a heater, heating pipelines and auxiliary components; the heating pipelines are arranged inside the heater, and the heater automatically controls the temperature of a corresponding one of a heating cavity of the second-stage heating system and a heating cavity of the third-stage heating system through a temperature sensor feedback signal of the corresponding one of a heating cavity of the second-stage heating system and a heating cavity of the third-stage heating system; the upper end of the heater is provided with a temperature sensor, the heater is externally connected with a temperature acquisition system, and the constant temperature is achieved through PID (Proportional-Integral-Differential) calculation of the system; the outlet of the heater is connected with a dry burning prevention system, and the dry burning prevention system detects heating liquid in the heating pipeline and is connected with a temperature and pressure sensor; the outlet of the temperature sensor is provided with a three-way valve, one end of the three-way valve is connected with a high-temperature and high-pressure stop valve and a high-temperature pressure reducing valve as a pressure release port, and the other end of the three-way valve is connected with a next heating pipeline through a safety valve and an explosion-proof valve; and the working pressure of the heating pipeline is less than or equal to 40 MPa, and the heating pipeline is made of nickel-base superalloy Inconel 718.

Further, the supercritical water pyrolysis reaction system for organic rock comprises a first supercritical water oxidation reaction kettle and a second supercritical water oxidation reaction kettle; a high-temperature and high-pressure stop valve is arranged between the outlet end of the first supercritical water oxidation reaction kettle and the inlet end of the second supercritical water oxidation reaction kettle; when the high-temperature and high-pressure stop valve is opened, the first supercritical water oxidation reaction kettle and the second supercritical water oxidation reaction kettle work in series, and the reaction distance is doubled; and when the high-temperature and high-pressure stop valve is closed, the first supercritical water oxidation reaction kettle and the second supercritical water oxidation reaction kettle respectively work independently.

Further, the temperature control heating system is provided with a PID automatic temperature control device, the temperature control heating system is insulated by heat insulation materials, and the heat insulation materials are alumina ceramic fibers and aluminum silicate ceramic fibers.

Further, the oxygen injection system comprises an oxygen cylinder, a first pressure reducing valve, a second pressure reducing valve, a gas mass flowmeter, a gas booster pump, high-pressure-resistant valves, an energy accumulator, a first high-pressure one-way valve, a second high-pressure one-way valve, a condenser, a preheater and a vacuum pump;

the outlet of the oxygen cylinder is provided with the first pressure reducing valve, the first pressure reducing valve is connected with one end of the gas booster pump through the gas mass flowmeter, the other end of the gas booster pump is connected with the energy accumulator through a high-pressure-resistant valve, the outlet of the energy accumulator is provided with the second pressure reducing valve, the outlet of the second pressure reducing valve is connected with the inlet end of the condenser through the first high-pressure one-way valve, the outlet end of the condenser is connected with the inlet end of the preheater through the second high-pressure one-way valve, the outlet end of the preheater is provided with a high-pressure three-way valve, one end of the high-pressure three-way valve is in series connection with the oxygen injection ports, and the other end of the high-pressure three-way valve is connected with the vacuum pump; and the injection pressure of the gas booster pump needs to reach 22 MPa to 42 MPa, and the control accuracy of the gas mass flowmeter is more than 90%.

Further, the branch oil-gas condensation and collection systems comprise high-temperature and high-pressure stop valves, heat exchange coil pipes, high-temperature pressure reducing valves, condensation heat exchange systems and gas-liquid separation systems; and the heat exchange coil pipes, the high-temperature pressure reducing valves and the condensation heat exchange systems are placed in water tanks for cooling treatment.

Further, the main oil-gas condensation and collection system comprises high-temperature and high-pressure stop valves, oil-gas filtering tanks, high-temperature stop valves, high-temperature pressure reducing valves, condensation heat exchange systems, high-temperature and high-pressure back pressure valves, bypass stop valves and gas-liquid separation systems.

the outlet end of the supercritical water oxidation reaction kettle is provided with a first-stage filter screen, the first-stage filter screen is connected with the lower end of the oil-gas filtering tank through the high-temperature and high-pressure stop valve, the middle of the oil-gas filtering tank is provided with a second-stage filter screen, the upper end of the oil-gas filtering tank is connected with the high-temperature pressure reducing valve through the high-temperature stop valve, and the high-temperature pressure reducing valve is connected with the inlet end of the condensation heat exchange system of the main oil-gas condensation and collection system through a high-temperature and high-pressure flange; and the outlet end of the condensation heat exchange system of the main oil-gas condensation and collection system is connected with the gas-liquid separation system of the main oil-gas condensation and collection system through the high-temperature and high-pressure back pressure valve.

Compared with the prior art, the system has the following beneficial effects.

Firstly, the multi-stage heating functions of heating by the preheating kettle, heating by the second-stage heater, heating by the three-stage heater, heating by the temperature control heating system and oxygen injection heating are realized.

Secondly, the actual high-temperature residual carbon heat utilization and hydrogen production process in the field can be simulated. The quality of oil-gas products under the comprehensive actions of the parameters such as heat injection temperature, heat injection pressure and reaction distance is systematically analyzed. The maximum reaction distance can reach 8 m, and is closer to the site from the perspective of size effect. The supercritical water oxidation oil and hydrogen production process capable of realizing multi-stage heating of organic rocks is completely simulated.

Figure 1:
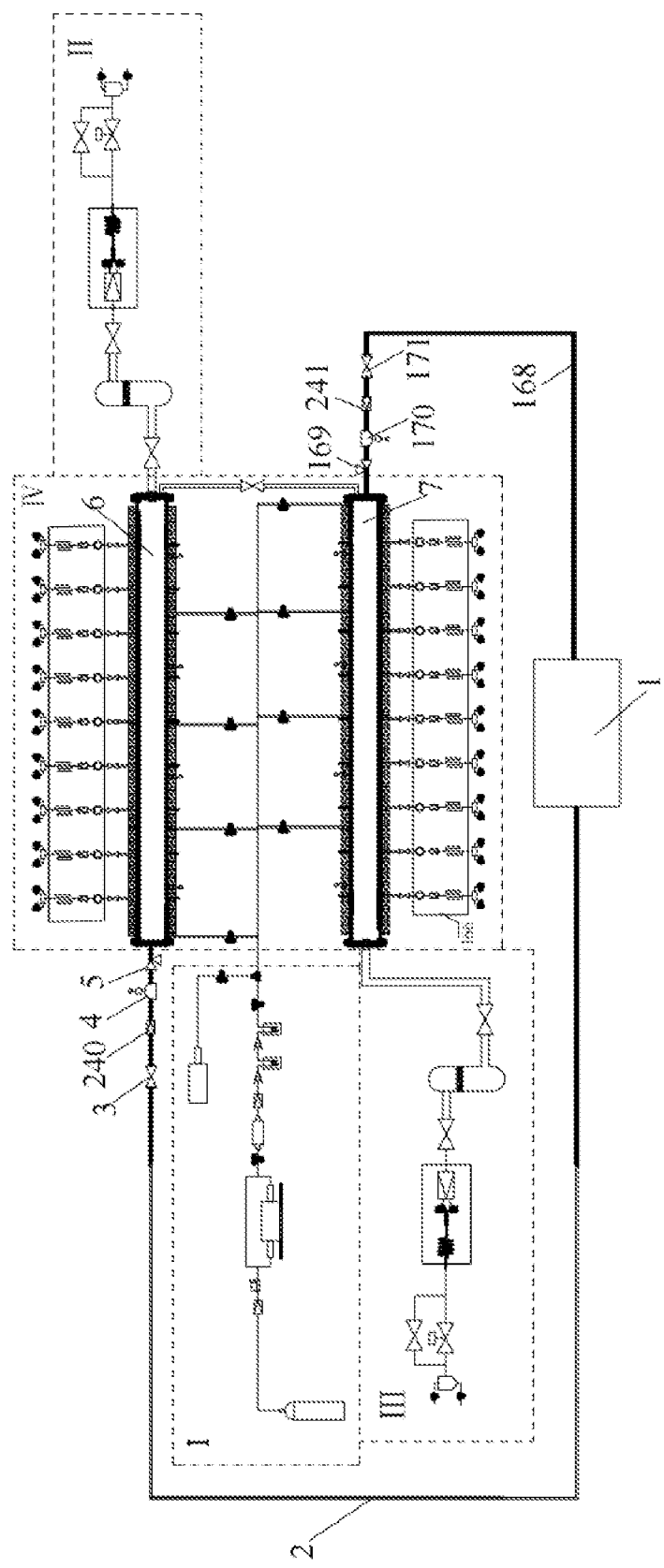
FIG. 1 is an overall structural schematic diagram of the present disclosure.

Reference signs in the attached figures: 1, supercritical water generator; 2, reaction kettle inlet pipeline; 3, high-temperature and high-pressure stop valve; 4, explosion-proof valve; 5, safety valve; 6, first supercritical water oxidation reaction kettle; 7, second supercritical water oxidation reaction kettle; 8, gas booster pump; 9, 10, high-pressure-resistant valve; 11, oxygen cylinder; 12, pressure reducing valve; 13, gas mass flowmeter; 14, 15, first-stage filter screen; 16, high-temperature and high-pressure stop valve; 17-24, oxygen injection port; 25-33, 35-43, thermocouple; 44-51, pressure sensor; 52-59, temperature control heating systems in sections; 60-63, high-temperature and high-pressure flange; 64-81, high-temperature and high-pressure stop valve; 82-99, heat exchange coil pipe; 100-117, high-temperature pressure reducing valve; 118-135, condensation heat exchange system; 136-153, gas-liquid separation system; 154, high-temperature and high-pressure stop valve; 155, high-temperature pressure reducing valve; 156, high-temperature and high-pressure flange; 157, condensation heat exchange system; 158, gas-liquid separation system; 159, high-temperature and high-pressure stop valve; 160, high-temperature pressure reducing valve; 161, high-temperature and high-pressure flange; 162, condensation heat exchange system; 163, gas-liquid separation system; 164-167, water tank; 168, reaction kettle inlet pipeline; 169, safety valve; 170, explosion-proof valve; 171, high-temperature and high-pressure stop valve; 172, central control system; 173, water replenishing tank; 174, liquid level gauge; 175, 176, high-temperature and high-pressure stop valve; 177, thermocouple; 178, condensation circulating pump; 179, front-end liquid replenishing pump; 180, 181, stop valve; 182, 183, high-pressure injection pump; 184, 185, pulse damper; 186, 187, overflow valve; 188, 189, safety valve; 190, 191, temperature and pressure sensor; 192, 193, explosion-proof valve; 194, condensing pipeline; 195, preheating kettle; 196, liquid level gauge; 197, heating cavity of preheating kettle; 198, temperature and pressure sensor; 199, high-temperature and high-pressure stop valve; 200, high-temperature pressure reducing valve; 201, high-temperature-resistant pressure transmitter; 202, safety valve; 203, explosion-proof valve; 204, 205, high-temperature and high-pressure stop valve; 206, high-temperature pressure reducing valve; 207, temperature sensor; 208, second-stage heating pipeline; 209, second-stage heater; 210, second-stage heating cavity; 211, dry burning prevention system; 212, temperature and pressure sensor; 213, safety valve; 214, explosion-proof valve; 215, high-temperature and high-pressure stop valve; 216, high-temperature pressuring reducing valve; 217, third-stage heater; 218, temperature sensor; 219, dry burning prevention system; 220, temperature and pressure sensor; 221, safety valve; 222, explosion-proof valve; 223, third-stage heating pipeline; 224, third-stage heating cavity; 225, high-temperature pressure reducing valve; 226, 227, high-temperature and high-pressure stop valve; 228-230, high temperature prevention strong exhaust system; 231, skid-mounted structure; 232, energy accumulator; 233, pressure reducing valve; 234, high-pressure one-way valve; 235, condenser; 236, high-pressure one-way valve; 237, preheater; 238, high-pressure-resistant valve; 239, vacuum pump; 240, oil-gas filtering tank; 241, second-stage filter screen; 242, high-temperature stop valve; 243, bypass stop valve; 244, high-temperature and high-pressure back pressure valve; 245, second-stage filter screen; 246, oil-gas filtering tank; 247, high-temperature stop valve; 248, high-temperature and high-pressure back pressure valve; 249, bypass stop valve; 250-257, high-temperature and high-pressure stop valve; and 258, high-pressure three-way valve.

DETAILED DESCRIPTION OF THE EMBODIMENTS

In order to make the technical problem to be solved, the technical scheme and the beneficial effects more clear, the present disclosure is further detailed in combination with the attached figures and the embodiment. It shall be understood that, the embodiments described herein are only intended to illustrate but not to limit the present disclosure. The technical scheme of the present disclosure is described in detail with reference to the following embodiments and attached figures, but the scope of protection is not limited by this.

As shown in FIG. 1, FIG. 2 and FIG. 5 to FIG. 8, the embodiment provides a pilot-scale supercritical water oxidation oil and hydrogen production system capable of realizing multi-stage heating of organic rock. The system comprises a supercritical water generator, a supercritical water pyrolysis reaction system for organic rock, an oxygen injection system and oil-gas condensation and collection systems.

Figure 2:
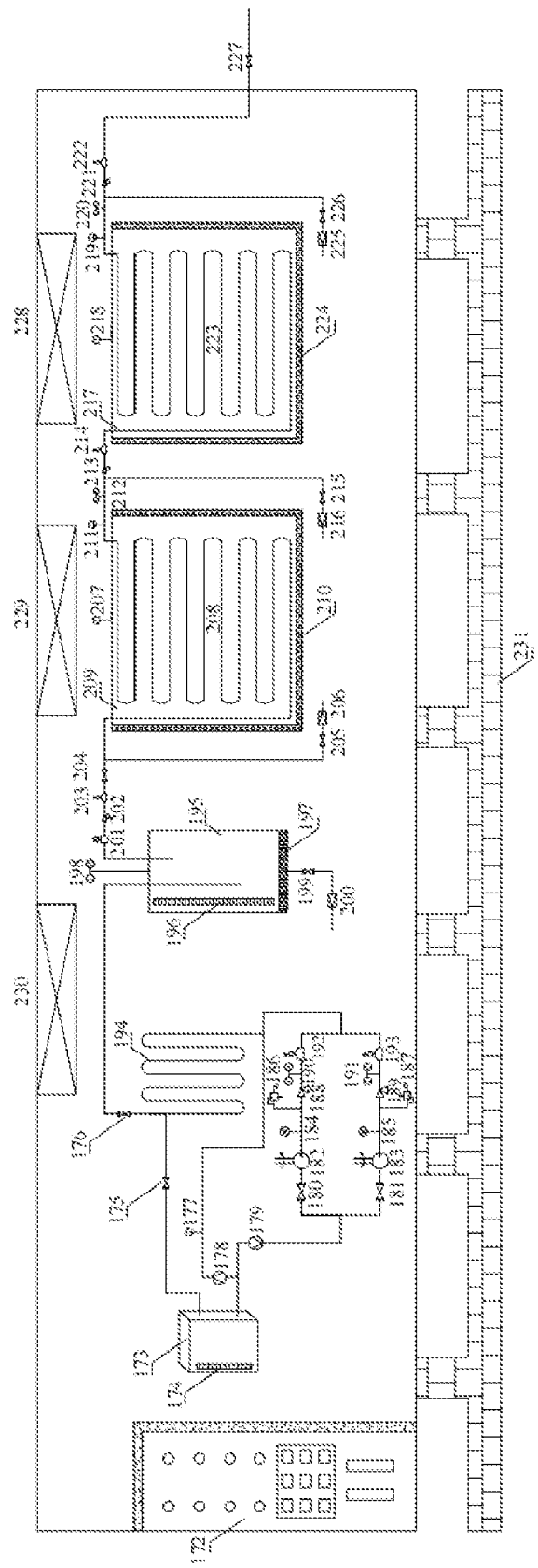
FIG. 2 is a structural schematic diagram of a supercritical water generator.
Figure 3:
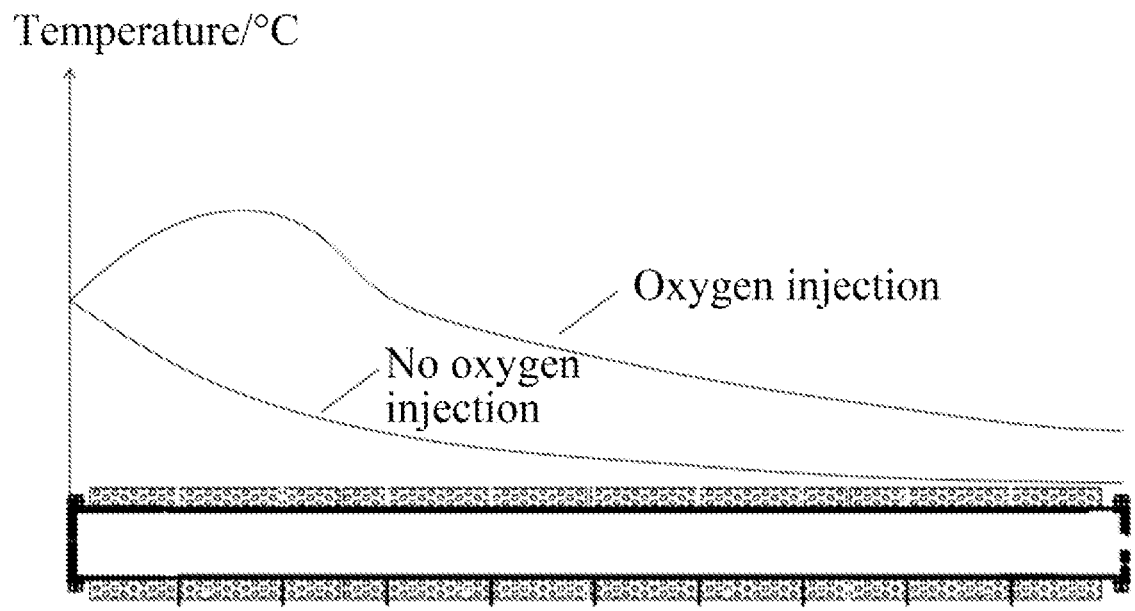
FIG. 3 is a temperature variation characteristic pattern in the oxygen injection and oxygen non-injection process inside a reaction kettle.
Figure 4:
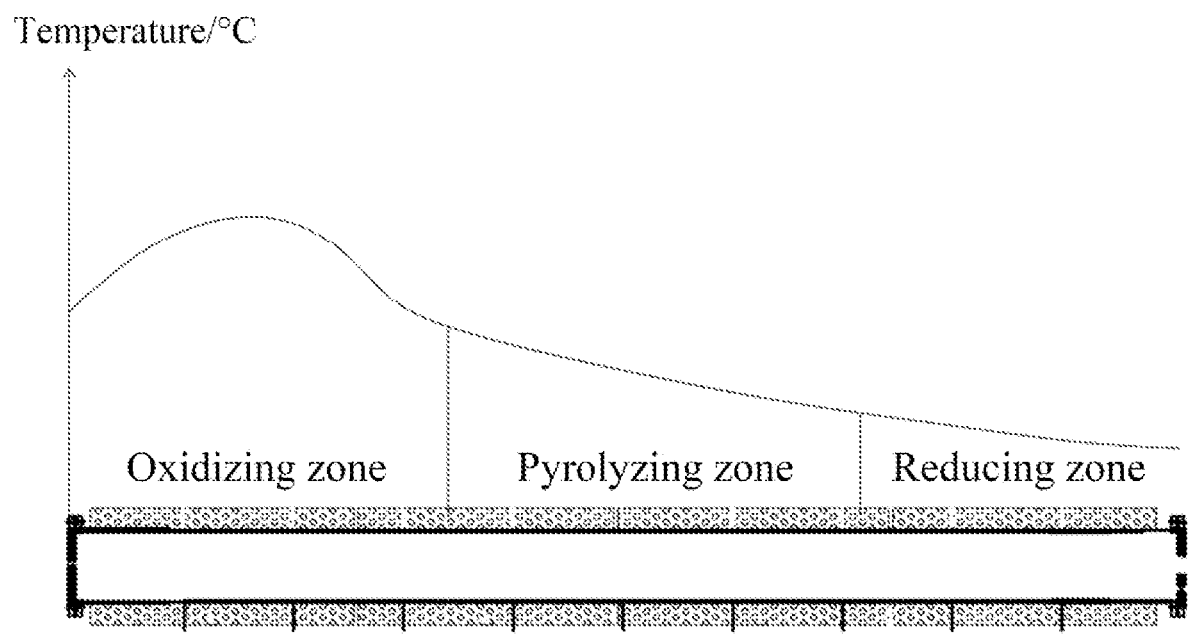
FIG. 4 is a pyrolysis partition zone division situation diagram in the oxygen injection process inside a reaction kettle.

In the first aspect, the supercritical water generator 1 mainly comprises a water injection system, a front-section preheating system, a second-stage heating system and a third-stage heating system, referring to FIG. 2.

Firstly, the water injection system mainly consists of a water replenishing tank 173, a condensation circulating pump 178, a front-end liquid replenishing pump 179, high-pressure injection pumps 182, 183 and a condensing pipeline 194.

The volume of the water replenishing tank 173 is 100 L to 150 L, and a liquid level gauge 174 is arranged on the water replenishing tank 173. The lower end of the water replenishing tank 173 is in series connection with the condensation circulating pump 178 and the front-end liquid replenishing pump 179. The condensing pipeline 194 is a double-layered pipeline.

A thermocouple 177 is arranged at the outlet end of the condensation circulating pump, and is connected with the lower end of one side of the outer layer of the condensing pipeline 194. Condensed water passes through a high-temperature and high-pressure stop valve 171 to enter the upper end of the water replenishing tank 173 through the upper end of the other side of the outer layer of the condensing pipeline 194, so that a closed and connected condensing channel is formed, and high-temperature heat of the preheating kettle 195 is prevented from being transmitted to the front-end high-pressure injection equipment part through heat conduction.

The front-end liquid replenishing pump 179 is connected with the high-pressure injection pumps 182, 183 through stop valves 180, 181. The outlets of the high-pressure injection pumps 182,183 are respectively provided with pulse dampers 184, 185 to reduce the liquid discharge pulse. Overflow valves 186, 187 are respectively arranged to automatically overflow when the set pressure is exceeded, so that the discharge pressure is not over-pressured. Safety valves 188,189 are respectively arranged. The set pressure of the safety valves 188, 189 is higher than that of the overflow valves 186,187 to prevent the overflow valves 186, 187 from being damaged by overpressure, and the pressure can be released through the safety valves 188, 189. Temperature and pressure sensors 190, 191 are respectively arranged to monitor the discharge temperature and pressure in real time. Explosion-proof valves 192, 193 are respectively arranged to prevent the pressure from suddenly rising during heating. The opening speed of the safety valves 188, 189 cannot reach the pressure release speed. The explosion-proof valves 192, 193 forcibly open bursting discs for rapid pressure release. The outlets of the explosion-proof valves 192, 193 are in parallel connection with the lower end of one side of the inner layer of the condensing pipeline 194. High-pressure water passes through a high-temperature and high-pressure stop valve 176 to enter the interior of a preheating kettle 195 through the upper end of the other side of the inner layer of the condensing pipeline 194.

The high-pressure injection pumps 182, 183 automatically control the start-stop and displacement of the pumps through pressure feedback. The maximum working pressure of the high-pressure injection pumps 182, 183 is 50 MPa. It should be noted that one of the high-pressure injection pumps 182, 183 is a standby pump, and the stop valves 180, 181 cannot be opened at the same time. The high-temperature and high-pressure stop valves 175, 176 cannot be opened at the same time. The high-temperature and high-pressure stop valve 175 is opened when pipeline condensation is needed, and the high-temperature and high-pressure stop valve 176 is opened when water injection into the preheating kettle 195 is needed. The pressure of the condensing pipeline 194 is lower than 0.5 MPa.

Secondly, the front-section preheating system mainly consists of a preheating kettle 195 and other auxiliary components.

A liquid level gauge 196 is arranged on the preheating kettle 195. A temperature and pressure sensor 198 is arranged on the top of the preheating kettle 195. Through the liquid level display, dry burning and other problems of the system are prevented. When the liquid level is lower than the set liquid level, the system can automatically give an alarm and turn off the heating function at the same time. A heating cavity 197 of the preheating kettle is formed in the bottom of the preheating kettle 195, a sewage outlet is formed in the lower end of the heating cavity 197, and the sewage outlet is connected with a high-temperature and high-pressure stop valve 199 and a high-temperature pressure reducing valve 200.

The temperature of the heating cavity is automatically controlled through a temperature sensor feedback signal of the heating cavity 197 of the preheating kettle, so that the temperature is steplessly adjustable.

A high-temperature-resistant pressure transmitter 201 is installed at the outlet of the preheating kettle 195 to monitor the pressure change at the outlet of the kettle in real time. The high-temperature-resistant pressure transmitter 201 is further connected with a safety valve 202, an explosion-proof valve 203 and a high-temperature and high-pressure stop valve 204. The set pressure of the safety valve 202 is greater than 5% of the working pressure of the equipment. The set pressure of the explosion-proof valve 203 is equal to the maximum design working pressure of the pipeline.

The outlet end of the high-temperature stop valve 204 enters into the interior of a second-stage heater 209, and the other end is connected with a high-temperature stop valve 205 and a high-temperature pressure reducing valve 206. If the pressure of the preheating kettle 195 is too high, the high-temperature stop valve 205 can be opened for pressure release.

The working temperature of the preheating kettle 195 is normal temperature to 350° C., the working pressure of the preheating kettle 195 is less than or equal to 40 MPa, and the design pressure of the preheating kettle 195 is less than or equal to 45 MPa. The preheating kettle 195 is 250 mm to 350 mm in inner diameter, 800 mm to 1200 mm in inner length, 60 L to 100 L in volume and 60 mm to 100 mm in wall thickness, and is made of nickel-base superalloy Inconel 718.

Thirdly, the second-stage heating system mainly consists of a second-stage heater 209, a second-stage heating pipeline 208 and other auxiliary components.

The second-stage heating pipeline 208 is located inside the second-stage heater 209, and a second-stage heating cavity 210 is formed in the two sides and the lower part of the second-stage heater 209. The temperature of the heating cavity is automatically controlled through the temperature sensor feedback signal of the heating cavity, and the temperature is steplessly adjustable. The upper end of the second-stage heater 209 is provided with a temperature sensor 207, and the temperature sensor 207 is externally connected with a temperature acquisition system. While the temperature is monitored, the heating temperature can be automatically set according to the user requirements, and the constant temperature function is achieved through PID (Proportional-Integral-Differential) calculation of the system.

The outlet of the second-stage heater 209 is provided with a dry burning prevention system 211. The system detects heating liquid in the second-stage heating pipeline 208, and the heating system can be automatically disconnected when the liquid outlet level is insufficient. The system is further connected with a temperature and pressure sensor 212. The outlet of the temperature sensor 212 is provided with a three-way valve. One end of the three-way valve is connected with a high-temperature and high-pressure stop valve 215 and a high-temperature pressure reducing valve 216 as a pressure release port, and the other end of the three-way valve is connected with a third-stage heating pipeline 223 through a safety valve 213 and an explosion-proof valve 214. The set pressure of the safety valve 213 is greater than 5% of the working pressure of the equipment. The set pressure of the explosion-proof valve 214 is equal to the maximum design working pressure of the pipeline.

The working temperature of the second-stage heating pipeline 208 is normal temperature to 500° C., the working pressure of the second-stage heating pipeline 208 is less than or equal to 40 MPa, and the design pressure of the second-stage heating pipeline 208 is less than or equal to 45 MPa. The second-stage heating pipeline 208 is 20 mm to 30 mm in inner diameter, 80 mm to 120 mm in wall thickness, 90 mm to 100 mm in length and 40 L to 50 L in single-stage volume, and is made of nickel-base superalloy Inconel 718.

Fourthly, the third-stage heating system mainly consists of a third-stage heater 217, a third-stage heating pipeline 223 and other auxiliary components.

The third-stage heating pipeline 223 is located inside the third-stage heater 217, and a third-stage heating cavity 224 is formed in the two sides and the lower part of the third-stage heater 217. The temperature of the heating cavity is automatically controlled through the temperature sensor feedback signal of the heating cavity, and the temperature is steplessly adjustable. The upper end of the third-stage heater 217 is provided with a temperature sensor 218, and the temperature sensor 218 is externally connected with a temperature acquisition system. While the temperature is monitored, the heating temperature can be automatically set according to the user requirements, and the constant temperature function is achieved through PID calculation of the system.

The outlet of the third-stage heater 217 is provided with a dry burning prevention system 219. The system detects heating liquid in the heating pipeline 223, and the heating system can be automatically disconnected when the liquid outlet level is insufficient. The system is further connected with a temperature and pressure sensor 220. The outlet of the temperature sensor 220 is provided with a three-way valve. One end of the three-way valve is connected with a high-temperature and high-pressure stop valve 226 and a high-temperature pressure reducing valve 225 as a pressure release port, and the other end of the three-way valve is connected with a high-temperature and high-pressure stop valve 227 through a safety valve 221 and an explosion-proof valve 222. The set pressure of the safety valve 221 is greater than 5% of the working pressure of the equipment. The set pressure of the explosion-proof valve 222 is equal to the maximum design working pressure of the pipeline.

The working temperature of the third-stage heating pipeline 223 is normal temperature to 650° C., the working pressure of the third-stage heating pipeline 223 is less than or equal to 40 MPa, and the design pressure of the third-stage heating pipeline 223 is less than or equal to 45 MPa. The third-stage heating pipeline 223 is 20 mm to 30 mm in inner diameter, 80 mm to 120 mm in wall thickness, 90 mm to 100 mm in length and 40 L to 50 L in single-stage volume, and is made of nickel-base superalloy Inconel 718.

The opening pressure of all the safety valves in the supercritical water generator 1 is set to 42 MPa, and the opening pressure of the left and right explosion valves is set to 45 MPa. The upper part of the supercritical water generator 1 is provided with high temperature prevention strong exhaust systems 228-230. The system can be turned on manually or automatically and forcibly when the environment temperature exceeds 40° C. The front-end liquid replenishing pump 179, the high-pressure injection pumps 182, 183, the temperature of the preheating kettle 195, the second-stage heater 209, the third-stage heater 217, the condensation circulating pump 178 and the high temperature prevention strong exhaust systems 228-230 are all controlled by a central control system 172. The central control system 172 is an independent space environment, and the periphery of the central control system 172 is disconnected by a heat preservation and insulation layer. The lower part of the supercritical water generator 1 is provided with a skid-mounted structure 231.

In the second aspect, the supercritical water pyrolysis reaction system for organic rock mainly comprises a first supercritical water oxidation reaction kettle 6, a second supercritical water oxidation reaction kettle 7 and other auxiliary components.

The first supercritical water oxidation reaction kettle 6 and the second supercritical water oxidation reaction kettle 7 are both made of nickel-base superalloy Inconel 718, and are both 4000 mm in lengths, 100 mm in inner diameters, and 25 mm in wall thicknesses. A high-temperature and high-pressure stop valve 16 is arranged between the outlet end of the first supercritical water oxidation reaction kettle 6 and the inlet end of the second supercritical water oxidation reaction kettle 7. When the high-temperature and high-pressure stop valve 16 is opened, the outlet end of the first supercritical water oxidation reaction kettle 6 and the second supercritical water oxidation reaction kettle 7 can work in series, and the reaction distance is doubled; and when the high-temperature and high-pressure stop valve 16 is closed, the two reaction kettles respectively work independently.

The first supercritical water oxidation reaction kettle 6 is provided with thermocouples 25-33 at equal intervals from the inlet to the outlet, pressure sensors 44-47 at equal intervals, temperature control heating systems 52-55 in sections, and oxygen injection ports 17-20 at equal intervals. The first supercritical water oxidation reaction kettle 6 is provided with nine branch oil-gas condensation and collection systems at equal intervals. The inlet end of the first supercritical water oxidation reaction kettle 6 is connected with a reaction kettle inlet pipeline 2 through a high-temperature and high-pressure flange 60, and the inlet end is provided with a high-temperature and high-pressure stop valve 3, an explosion-proof valve 4 and a safety valve 5. The outlet end of the supercritical water oxidation reaction kettle 6 is connected with a main oil-gas condensation and collection system through a high-temperature and high-pressure flange 61.

The endurable temperature of the first supercritical water oxidation reaction kettle 6 can reach 800° C., the design pressure is 37 MPa, the explosion pressure of the explosion-proof valve 4 is 35 MPa, and the opening pressure of the safety valve 5 is 32 MPa.

The second supercritical water oxidation reaction kettle 7 is provided with thermocouples 35-43 at equal intervals from the inlet to the outlet, pressure sensors 48-51 at equal intervals, temperature control heating systems 56-59 in sections, and oxygen injection ports 21-24 at equal intervals. The second supercritical water oxidation reaction kettle 7 is provided with nine branch oil-gas condensation and collection systems at equal intervals. The inlet end of the second supercritical water oxidation reaction kettle 7 is connected with a reaction kettle inlet pipeline 168 through a high-temperature and high-pressure flange 62, and the inlet end is provided with a high-temperature and high-pressure stop valve 171, an explosion-proof valve 170 and a safety valve 169. The outlet end of the second supercritical water oxidation reaction kettle 7 is connected with a main oil-gas condensation and collection system through a high-temperature and high-pressure flange 63.

The endurable temperature of the supercritical water oxidation reaction kettle 7 can reach 650° C., the design pressure is 45 MPa, the explosion pressure of the explosion-proof valve 170 is 45 MPa, and the opening pressure of the safety valve 169 is 42 MPa.

The temperature control heating system 52-59 in sections has a PID automatic temperature control function and an overtemperature alarm automatic power-off function, and double couples are designed. The temperature control heating systems 52-59 in sections are insulated by heat insulation materials, and the heat insulation materials are environment-friendly nontoxic alumina ceramic fibers and aluminum silicate ceramic fiber materials.

Figure 5:
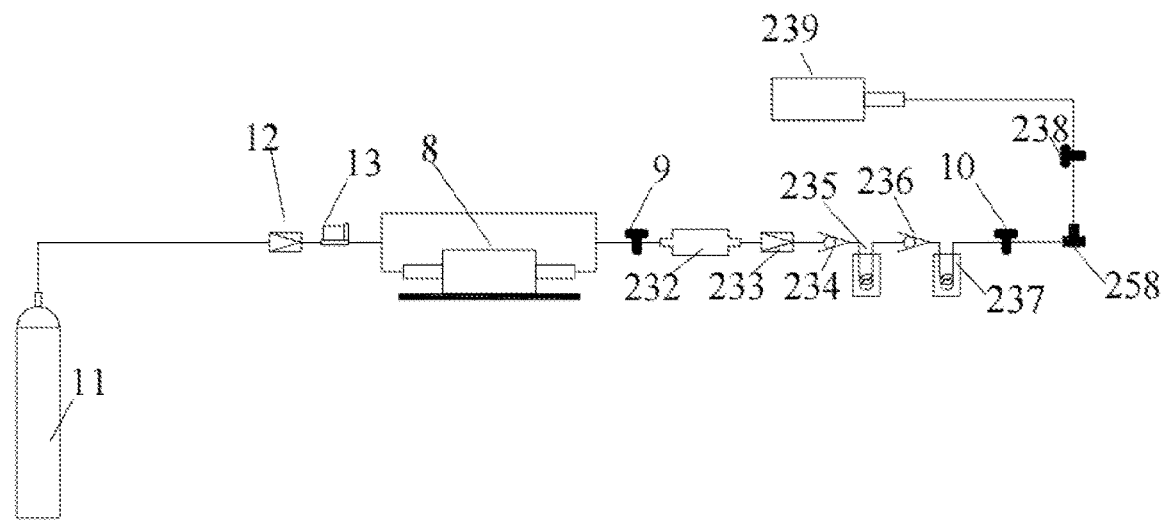
FIG. 5 is an enlarged drawing of I in FIG. 1, namely a connecting schematic diagram of an oxygen injection system.
Figure 6:
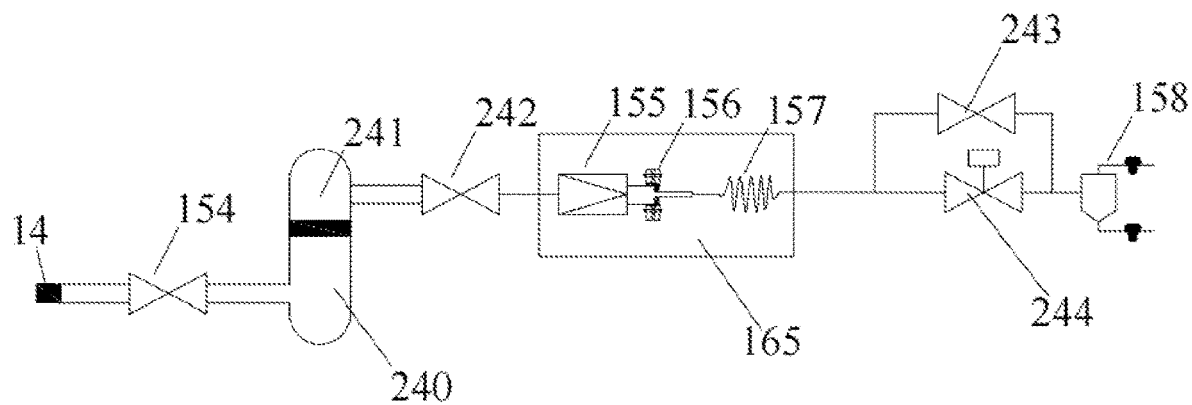
FIG. 6 is an enlarged drawing of II in FIG. 1, namely a connecting schematic diagram of a main oil-gas condensation and collection system connected with a first supercritical water oxidation reaction kettle.
Figure 7:
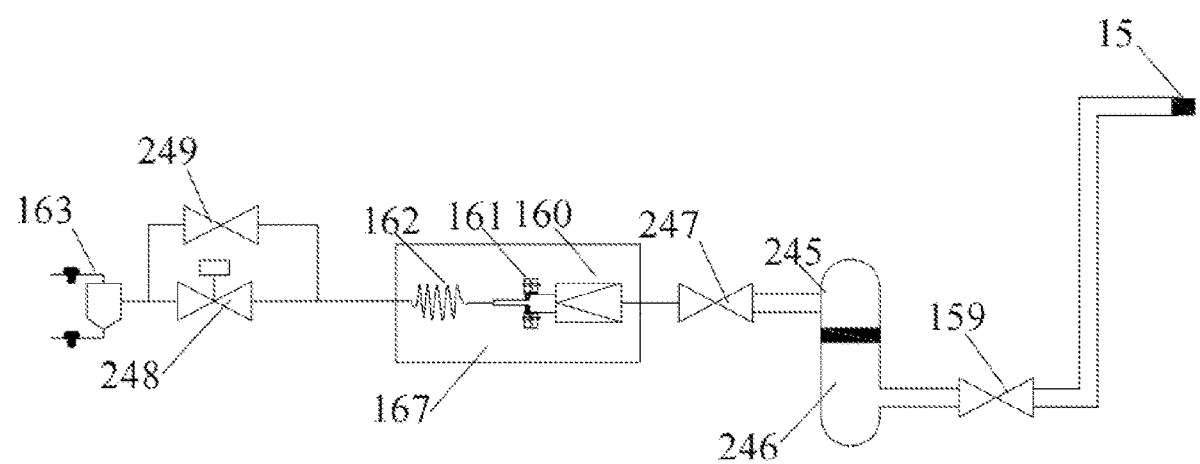
FIG. 7 is an enlarged drawing of III in FIG. 1, namely a connecting schematic diagram of a main oil-gas condensation and collection system connected with a second supercritical water oxidation reaction kettle.
Figure 8:
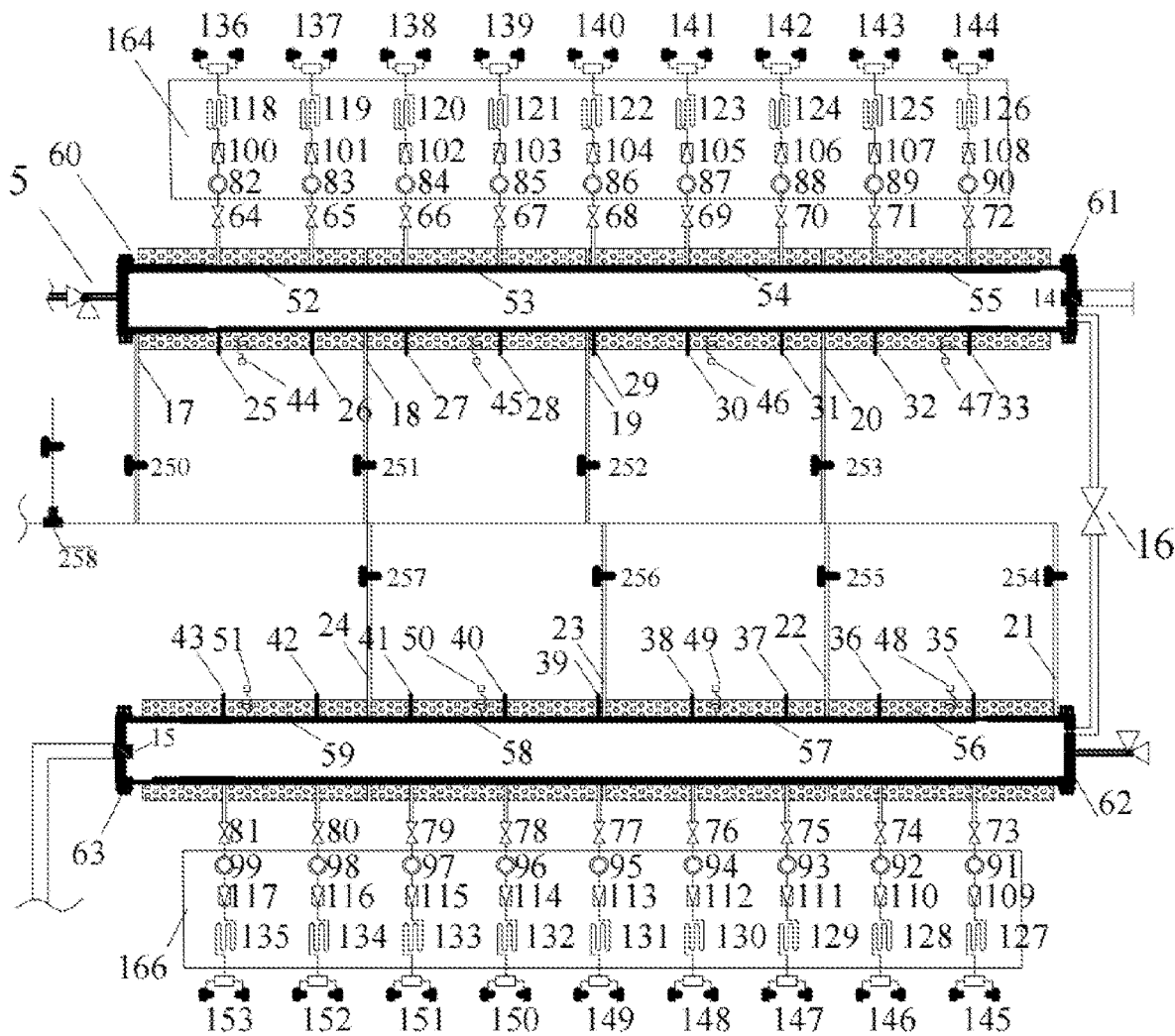
FIG. 8 is an enlarged drawing of IV in FIG. 1, namely a supercritical water pyrolysis reaction system for organic rock.

Thirdly, the oxygen injection system mainly comprises an oxygen cylinder 11, a pressure reducing valve 12, a gas mass flowmeter 13, a gas booster pump 8, high-pressure-resistant valves 9, 10, 238, an energy accumulator 232, a pressure reducing valve 233, a high-pressure one-way valve 234, a condenser 235, a high-pressure one-way valve 236, a preheater 237 and a vacuum pump 239, referring to FIG. 5.

The outlet of the oxygen cylinder 11 is provided with the pressure reducing valve 12. The pressure reducing valve 12 is connected with one end of the gas booster pump 8 through the gas mass flowmeter 13, and the other end of the gas booster pump 8 is connected with the energy accumulator 232 through a high-pressure-resistant valve 9. The outlet of the energy accumulator 232 is provided with the pressure reducing valve 233. The outlet of the pressure reducing valve 233 is connected with the inlet end of the condenser 235 through the high-pressure one-way valve 234. The outlet end of the condenser 235 is connected with the inlet end of the preheater 237 through the high-pressure one-way valve 236. The outlet end of the preheater 237 is provided with a high-pressure three-way valve 258. One end of the high-pressure three-way valve 258 is in series connection with the oxygen injection ports 17-24, and the other end of the high-pressure three-way valve 258 is connected with the vacuum pump 239.

The injection pressure of the gas booster pump 8 needs to reach 22 MPa to 42 MPa, and the control accuracy of the gas mass flowmeter 13 is more than 90%. The flow rate of oxygen injection is controlled to be 5 mL/min to 5 L/min.

In the fourth aspect, the oil-gas condensation and collection systems comprise branch oil-gas condensation and collection systems and a main oil-gas condensation and collection system.

The branch oil-gas condensation and collection systems comprise high-temperature and high-pressure stop valves 64-81, heat exchange coil pipes 82-99, high-temperature pressure reducing valves 100-117, condensation heat exchange systems 118-135 and gas-liquid separation systems 136-153.

The heat exchange coil pipes 82-99, the high-temperature pressure reducing valves 100-117 and the condensation heat exchange systems 118-135 are placed in water tanks 164, 166 for cooling treatment.

The main oil-gas condensation and collection system comprises high-temperature and high-pressure stop valves 154, 159, oil-gas filtering tanks 240, 246, high-temperature stop valves 242, 247, high-temperature pressure reducing valves 155, 160, condensation heat exchange systems 157, 162, high-temperature and high-pressure back pressure valves 244, 248, bypass stop valves 243, 249 and gas-liquid separation systems 158, 163.

The outlet end of the first supercritical water oxidation reaction kettle 6 is provided with a first-stage filter screen 4. The first-stage filter screen 14 is connected with the lower end of the oil-gas filtering tank 140 through the high-temperature and high-pressure stop valve 154. The middle of the oil-gas filtering tank 240 is provided with a second-stage filter screen 241. The upper end of the oil-gas filtering tank 240 is connected with the high-temperature pressure reducing valve 155 through the high-temperature stop valve 242. The high-temperature pressure reducing valve 155 is connected with the inlet end of the condensation heat exchange system 157 through a high-temperature and high-pressure flange 156. The high-temperature and high-pressure flange 156 is used for converting a large-diameter sample outlet into a small-diameter sample outlet. The outlet end of the condensation heat exchange system 157 is connected with the gas-liquid separation system 158 through the high-temperature and high-pressure back pressure valve 244, and the bypass stop valves 243 are arranged on the two sides of the high-temperature and high-pressure back pressure valve 244.

The outlet end of the second supercritical water oxidation reaction kettle 7 is provided with a first-stage filter screen 15. The first-stage filter screen 15 is connected with the lower end of the oil-gas filtering tank 246 through the high-temperature and high-pressure stop valve 159. The middle of the oil-gas filtering tank 246 is provided with a second-stage filter screen 245. The upper end of the oil-gas filtering tank 246 is connected with the high-temperature pressure reducing valve 160 through the high-temperature stop valve 247. The high-temperature pressure reducing valve 160 is connected with the inlet end of the condensation heat exchange system 162 through a high-temperature and high-pressure flange 161. The high-temperature and high-pressure flange 161 is used for converting a large-diameter sample outlet into a small-diameter sample outlet. The outlet end of the condensation heat exchange system 162 is connected with the gas-liquid separation system 163 through the high-temperature and high-pressure back pressure valve 248, and the bypass stop valves 249 are arranged on the two sides of the high-temperature and high-pressure back pressure valve 248.

The high-temperature pressure reducing valves 155, 160, the high-temperature and high-pressure flange 156, 161 and the condensation heat exchange systems 157, 162 are placed in water tanks 165, 167 for cooling treatment.

The operating steps of pilot-scale supercritical water oxidation oil and hydrogen production system capable of realizing multi-stage heating of organic rock are as follows.

Firstly, organic rock blocks are tightly filled into the supercritical water oxidation reaction kettle 6 and the supercritical water oxidation reaction kettle 7, and the systems are tightly connected. Whether the valve interfaces of all the high-temperature and high-pressure stop valves are connected and fastened or not are checked, especially the joints of the high-temperature and high-pressure flanges 60-63 are checked. All the high-temperature and high-pressure stop valves are closed.

Secondly, water is added into the water replenishing tank 173 to ensure that the water level is sufficient and the high-temperature and high-pressure stop valve 199 is closed.

Thirdly, the front-end liquid replenishing pump 179 and the high-pressure injection pump 182 or 183 are opened, and the stop valve 180 or 181 connected with the high-pressure injection pump is opened. The central control system 172 can set the working frequency and flow rate of the high-pressure injection pump.

Fourthly, the stop valve 180 and the high-temperature and high-pressure stop valves 176, 204, 227 are opened, and the safety pressure of the equipment is set to be 5 MPa until liquid in the high-temperature and high-pressure stop valve 227 is discharged and the valve is closed. Whether the pressure of the central control system 172 reaches the preset pressure value of 5 MPa or not is observed, and whether the high-pressure injection pump 182 or 183 is automatically stopped or not after the pressure is reached is observed. If no pressure release occurs under the warm pressure for 20 minutes, it means that the components are well sealed.

Fifthly, the heating temperature of the preheating kettle is set to be 350° C., the heating temperature of the second-stage heater is set to be 500° C., and the heating temperature of the third-stage heater is set to be 650° C. The high-temperature and high-pressure stop valve 176, 180 or 181 is closed, the high-temperature and high-pressure stop valve 175 is opened, the condensation circulating pump 178 is opened, and the high temperature prevention strong exhaust systems 228-230 are opened when the environment temperature is high.

Sixthly, the heating button of the preheating kettle, the heating button of the second-stage heater and the heating button of the third-stage heater are turned on in sequence. The initial set pressure of 5 Mpa is set to be the experimental demand pressure of 22-40 MPa. The high-pressure injection pump 182 or 183 is automatically started. When the demand pressure value is reached, the high-pressure injection pump 182 or 183 can automatically stop. When all the temperatures reach the preset values, the pressure changes of the temperature and pressure sensors 198, 212, 220 are observed.

Seventhly, when the set pressure is lower than 30 MPa, the high-temperature and high-pressure stop valve 3 is opened, the high-temperature and high-pressure stop valve 154 is slightly opened, and the temperature control heating system 52 is turned on. The temperature control heating system 52 is a four-stage heating device with a set temperature of 650-800° C. to further heat supercritical water. After the organic rock blocks in the first supercritical water oxidation reaction kettle 6 are pyrolyzed for a period of time, the high-temperature and high-pressure stop valves 64, 65 are opened to collect oil and gas. When few oil-gas products obtained by the gas-liquid separation systems 136,137 are obtained, it means that the pyrolysis of the organic rock blocks at the front end of the high-temperature and high-pressure stop valve 65 in the first supercritical water oxidation reaction kettle 6 is almost completed, and a residual carbon reaction zone is formed. At the moment, the high-temperature and high-pressure stop valves 64, 65 are closed, and the condenser 235 and the preheater 237 are turned on. The injection pressure of the gas booster pump 8 is set to exceed the experimental pressure of the supercritical water generator 1. A reasonable way is chosen to open the high-temperature and high-pressure stop valves 250-257 according to the pyrolysis situation in the reaction kettle, so that the residual carbon reaction zone reacts with oxygen to release a large amount of heat, and organic rock in other pyrolysis zones is also pyrolyzed to form part of residual carbon, and the residual carbon reaction zone also reacts with oxygen to release heat. At the same time, high-temperature residual carbon strongly reacts with oxygen and water to form a large amount of hydrogen, so that the pyrolysis effect of organic rock to produce hydrogen is achieved, and the temperature in the whole first supercritical water oxidation reaction kettle 6 is increased to form five-stage heating. The high-pressure-resistant valve 9 is opened, and the energy accumulator 232 and the gas booster pump 8 are adjusted according to the temperature change of the thermocouples 25-33, so that the flow rate of oxygen injection is controlled. The flow acquisition control system 13 can monitor and acquire the flow rate of oxygen injected into the first supercritical water oxidation reaction kettle 6 in real time.

Eighthly, when the temperature change of the thermocouples 25-33 is extremely slow, the high-pressure-resistant valve 9 is closed, the temperature control heating system 53 is turned on, the temperature is set to be 650-800° C. as well, and the high-temperature and high-pressure stop valves 66-68 are opened to collect oil and gas. When few oil-gas products are obtained by the gas-liquid separation systems 138-140, the high-temperature and high-pressure stop valves 66-68 are closed, the high-pressure-resistant valve 9 is opened, and the temperature change of the thermocouples 27-33 is observed. At the moment, the pyrolyzed organic rocks in the range of the temperature control heating system 53 react with oxygen to release a large amount of heat, so that the effect of heating supercritical water is achieved. When the temperature change of the thermocouples 27-33 is extremely slow, the high-pressure-resistant valve 9 is closed, the temperature control heating system 54 is turned on, the temperature is set to be 650-800° C., and the high-temperature and high-pressure stop valves 69, 70 are opened to collect oil and gas. So, a series of operations, including oxygen injection heating, heating by the temperature control heating system and oil and gas collection are carried out step by step until organic rocks in the supercritical water oxidation reaction kettle 6 are fully reacted and pyrolyzed to form oil and gas. In the pyrolysis process, the gas-liquid separation system 158 always carries out oil-gas separation and collection.

Ninthly, when the temperature of the thermocouple 33 drops to 650° C., the high-temperature and high-pressure stop valve 16 is opened, the high-temperature and high-pressure stop valve 154 is closed, and the high-temperature and high-pressure stop valve 159 is slightly opened. The organic rock blocks in the second supercritical water oxidation reaction kettle 7 are pyrolyzed as well. The temperature of the temperature control heating system is set to be 650° C. A series of operations, including heating by the temperature control heating system 56, oil and gas collection by opening the high-temperature and high-pressure stop valves 73, 74, oxygen injection heating, heating by the temperature control heating system 57, oil and gas collection by opening the high-temperature and high-pressure stop valves 75, 76, oxygen injection heating, heating by the temperature control heating system 58, oil and gas collection by opening the high-temperature and high-pressure stop valves 77-79, oxygen injection heating, heating by the temperature control heating system 59 and oil and gas collection by opening the high-temperature and high-pressure stop valves 80, 81 are carried out according to the above-mentioned method. During oxygen injection heating, the high-pressure-resistant valve 9 is opened, and the energy accumulator 232 and the gas booster pump 8 are adjusted according to the temperature change of the thermocouples 35-43, so that the flow rate of oxygen injection is controlled. The flow acquisition control system 13 can monitor and acquire the flow rate of oxygen injected into the second supercritical water oxidation reaction kettle 7 in real time.

Tenthly, when the set pressure is higher than 30 MPa, the high-temperature and high-pressure stop valve 171 is opened, and the high-temperature and high-pressure stop valve 159 is slightly opened. After the organic rock blocks in the second supercritical water oxidation reaction kettle 7 are pyrolyzed for a period of time, the high-temperature and high-pressure stop valves 73, 74 are opened to collect oil and gas. When few oil-gas products obtained by the gas-liquid separation systems 145, 146 are obtained, it means that the pyrolysis of the organic rock blocks in the range of the temperature control heating system is almost completed, and a residual carbon reaction zone is formed. At the moment, the high-temperature and high-pressure stop valves 73, 74 are closed. The injection pressure of the gas booster pump 8 is set to exceed the experimental pressure of the supercritical water generator 1. The high-pressure-resistant valve 9 is opened, and the energy accumulator 232 and the gas booster pump 8 are adjusted according to the temperature change of the thermocouples 35-43, so that the flow rate of oxygen injection is controlled. The flow acquisition control system 13 can monitor and acquire the flow rate of oxygen injected into the supercritical water oxidation reaction kettle 7 in real time.

Eleventhly, when the temperature change of the thermocouples 35-43 is extremely slow, the high-pressure-resistant valve 9 is closed, the temperature control heating system 57 is turned on, the temperature is set to be a test requirement temperature, and the high-temperature and high-pressure stop valves 75, 76 are opened to collect oil and gas. When few oil-gas products are obtained by the gas-liquid separation systems 147, 148, the high-temperature and high-pressure stop valves 75, 76 are closed, the high-pressure-resistant valve 9 is opened, and the temperature change of the thermocouples 37-43 is observed. At the moment, the pyrolyzed organic rocks in the range of the temperature control heating system 53 react with oxygen to release a large amount of heat, so that the effect of heating supercritical water is achieved. When the temperature change of the thermocouples 37-43 is extremely slow, the high-pressure-resistant valve 9 is closed, the temperature control heating system 58 is turned on, the temperature is set to be the test requirement temperature, and the high-temperature and high-pressure stop valves 77-79 are opened to collect oil and gas. So, a series of operations, including oxygen injection heating, heating by the temperature control heating system and oil and gas collection are carried out step by step until organic rocks in the second supercritical water oxidation reaction kettle 7 are fully reacted and pyrolyzed to form oil and gas. In the pyrolysis process, the gas-liquid separation system 163 always carries out oil-gas separation and collection.

Twelfthly, after the test, all the heating systems are firstly turned off. On the premise of ensuring the safety, pressure reduction can be carried out on the system by opening the high-temperature and high-pressure stop valves 154, 159, 205, 215, 226, and the internal temperature of the system can be slowly reduced by continuously injecting cold water, so that the equipment can reach the corresponding safety value. When all the values are in a safe state, all the outlet valves of the system can be opened in an emptying state.

The above is further detailed description of the present disclosure in combination with specific preferred embodiment, but it cannot be considered that the specific embodiment of the present disclosure is limited to this. For those skilled in the art to which the present disclosure belongs, a number of simple deductions or substitutions can be made without departing from the present disclosure, all of which should be regarded as belonging to the patent protection scope of the present disclosure determined by the submitted claims.

What is claimed is:

1. A pilot-scale supercritical water oxidation oil and hydrogen production system capable of realizing multi-stage heating of organic rock, comprising a supercritical water generator, a supercritical water pyrolysis reaction system for organic rock, an oxygen injection system, branch oil-gas condensation and collection systems and a main oil-gas condensation and collection system, wherein the supercritical water generator mainly comprises a water injection system, a front-section preheating system, a second-stage heating system and a third-stage heating system which are connected in sequence; the front-section preheating system comprises a preheating kettle, the working temperature of the preheating kettle is 25-350° C., the working temperature of the second-stage heating system is 25-500° C., and the working temperature of the third-stage heating system is 25-650° C.;

the supercritical water pyrolysis reaction system for organic rock comprises a supercritical water oxidation reaction kettle; the supercritical water oxidation reaction kettle is provided with thermocouples at equal intervals from an inlet to an outlet, pressure sensors at equal intervals from the inlet to the outlet, temperature control heating systems in sections, and oxygen injection ports at equal intervals from the inlet to the outlet; the branch oil-gas condensation and collection systems are arranged at equal intervals from the inlet to the outlet; an inlet end of the supercritical water oxidation reaction kettle is connected with the supercritical water generator through a pipeline; an outlet end of the supercritical water oxidation reaction kettle is connected with the main oil-gas condensation and collection system; an endurable temperature of the supercritical water oxidation reaction kettle is greater than or equal to 800° C.; the oxygen injection ports are connected with the oxygen injection system; the flow rate of oxygen injection of the oxygen injection system is 5 mL/min to 5 L/min; and the main oil-gas condensation and collection system comprises an oil-gas filtering device, and a condensation heat exchange system and a gas-liquid separation system which are connected with the oil-gas filtering device.

2. The pilot-scale supercritical water oxidation oil and hydrogen production system capable of realizing multi-stage heating of organic rock according to claim 1, wherein the water injection system comprises a water replenishing tank, a condensation circulating pump, a front-end liquid replenishing pump, high-pressure injection pumps and a condensing pipeline; a thermocouple is arranged at an outlet end of the condensation circulating pump; and the condensation circulating pump, the condensing pipeline and the water replenishing tank form a closed and connected condensing channel.

3. The pilot-scale supercritical water oxidation oil and hydrogen production system capable of realizing multi-stage heating of organic rock according to claim 2, wherein the front-end liquid replenishing pump is connected with the high-pressure injection pumps through stop valves, and an outlet of each of the high-pressure injection pumps is provided with a pulse damper, an overflow valve, a safety valve, a temperature and pressure sensor and an explosion-proof valve; the set pressure of the safety valve is greater than that of the overflow valve; an outlet of the explosion-proof valve is connected with the condensing pipeline; and high-pressure water passes through a high-temperature and high-pressure stop valve to enter the interior of the preheating kettle through the condensing pipe.

4. The pilot-scale supercritical water oxidation oil and hydrogen production system capable of realizing multi-stage heating of organic rock according to claim 3, wherein a liquid level gauge is arranged on the preheating kettle, and a temperature and pressure sensor is arranged on a top of the preheating kettle; and a heating cavity of the preheating kettle is formed in a bottom of the preheating kettle, a sewage outlet is formed in a lower end of the heating cavity of the preheating kettle, and the sewage outlet is connected with a high-temperature and high-pressure stop valve and a high-temperature pressure reducing valve.

5. The pilot-scale supercritical water oxidation oil and hydrogen production system capable of realizing multi-stage heating of organic rock according to claim 4, wherein each of the second-stage heating system and the third-stage heating system comprises a heater, heating pipelines and auxiliary components; the heating pipelines are arranged inside the heater, and the heater automatically controls the temperature of a corresponding one of a heating cavity of the second-stage heating system and a heating cavity of the third-stage heating system through a temperature sensor feedback signal of the corresponding one of the heating cavity of the second-stage heating system and the heating cavity of the third-stage heating system; an upper end of the heater is provided with a temperature sensor, the heater is externally connected with a temperature acquisition system, and the constant temperature is achieved through PID (Proportional-Integral-Differential) calculation of the temperature acquisition system; an outlet of the heater is connected with a dry burning prevention system, and the dry burning prevention system detects heating liquid in the heating pipelines and is connected with a temperature and pressure sensor; an outlet of the temperature sensor is provided with a three-way valve, one end of the three-way valve is connected with a high-temperature and high-pressure stop valve and a high-temperature pressure reducing valve as a pressure release port, and the other end of the three-way valve is connected with a next heating pipeline, which is included in the third-stage heating system, of the heating pipelines through a safety valve and an explosion-proof valve; and the working pressure of the heating pipelines is less than or equal to 40 MPa, and the heating pipelines are made of nickel-base superalloy.

6. The pilot-scale supercritical water oxidation oil and hydrogen production system capable of realizing multi-stage heating of organic rock according to claim 1, wherein the supercritical water pyrolysis reaction system for organic rock comprises a first supercritical water oxidation reaction kettle and a second supercritical water oxidation reaction kettle; a high-temperature and high-pressure stop valve is arranged between an outlet end of the first supercritical water oxidation reaction kettle and an inlet end of the second supercritical water oxidation reaction kettle; when the high-temperature and high-pressure stop valve is opened, the first supercritical water oxidation reaction kettle and the second supercritical water oxidation reaction kettle work in series, and the reaction distance is doubled; and when the high-temperature and high-pressure stop valve is closed, the first supercritical water oxidation reaction kettle and the second supercritical water oxidation reaction kettle respectively work independently.

7. The pilot-scale supercritical water oxidation oil and hydrogen production system capable of realizing multi-stage heating of organic rock according to claim 1, wherein each of the temperature control heating systems is provided with a PID automatic temperature control device, the temperature control heating systems are insulated by heat insulation materials, and the heat insulation materials are alumina ceramic fibers and aluminum silicate ceramic fibers.

8. The pilot-scale supercritical water oxidation oil and hydrogen production system capable of realizing multi-stage heating of organic rock according to claim 1, wherein the oxygen injection system comprises an oxygen cylinder, a first pressure reducing valve, a second pressure reducing valve, a gas mass flowmeter, a gas booster pump, high-pressure-resistant valves, an energy accumulator, a first high-pressure one-way valve, a second high-pressure one-way valves, a condenser, a preheater and a vacuum pump;

an outlet of the oxygen cylinder is provided with the first pressure reducing valve, the first pressure reducing valve is connected with one end of the gas booster pump through the gas mass flowmeter, an other end of the gas booster pump is connected with the energy accumulator through a which-pressure-resistant valve, an outlet of the energy accumulator is provided with the second pressure reducing valve, an outlet of the second pressure reducing valve is connected with an inlet end of the condenser through the first high-pressure one-way valve, an outlet end of the condenser is connected with an inlet end of the preheater through the second high-pressure one-way valve, an outlet end of the preheater is provided with a high-pressure three-way valve, one end of the high-pressure three-way valve is in series connection with the oxygen injection ports, and the other end of the high-pressure three-way valve is connected with the vacuum pump; and an injection pressure of the gas booster pump ranges from 22 MPa to 42 MPa, and a control accuracy of the gas mass flowmeter is more than 90%.

9. The pilot-scale supercritical water oxidation oil and hydrogen production system capable of realizing multi-stage heating of organic rock according to claim 1, wherein the branch oil-gas condensation and collection systems comprise high-temperature and high-pressure stop valves, heat exchange coil pipes, high-temperature pressure reducing valves, condensation heat exchange systems and gas-liquid separation systems; and the heat exchange coil pipes, the high-temperature pressure reducing valves and the condensation heat exchange systems are placed in water tanks for cooling treatment.

10. The pilot-scale supercritical water oxidation oil and hydrogen production system capable of realizing multi-stage heating of organic rock according to claim 1, wherein the main oil-gas condensation and collection system comprises high-temperature and high-pressure stop valves, oil-gas filtering tanks, high-temperature stop valves, high-temperature pressure reducing valves, condensation heat exchange systems, high-temperature and high-pressure back pressure valves, bypass stop valves and gas-liquid separation systems;

the outlet end of the supercritical water oxidation reaction kettle is provided with a first-stage filter screen, the first-stage filter screen is connected with a lower end of each of the oil-gas filtering tanks through a corresponding one of the high-temperature and high-pressure stop valves, a middle of each of the oil-gas filtering tanks is provided with a second-stage filter screen, an upper end of each of the oil-gas filtering tanks is connected with a corresponding one of the high-temperature pressure reducing valves through a corresponding one of the high-temperature stop valves, and the corresponding one of the high-temperature pressure reducing valves is connected with an inlet end of each of the condensation heat exchange systems of the main oil-gas condensation and collection system through a high-temperature and high-pressure flange; and an outlet end of each of the condensation heat exchange systems of the main oil-gas condensation and collection system is connected with a corresponding one of the gas-liquid separation systems of the main oil-gas condensation and collection system through a corresponding one of the high-temperature and high-pressure back pressure valves as well as a corresponding one of the bypass stop valves.

11. The pilot-scale supercritical water oxidation oil and hydrogen production system capable of realizing multi-stage heating of organic rock according to claim 6, wherein each of the temperature control heating systems is provided with a PID automatic temperature control device, the temperature control heating systems are insulated by heat insulation materials, and the heat insulation materials are alumina ceramic fibers and aluminum silicate ceramic fibers.

* * * * *